No. 862,350.

PATENTED AUG. 6, 1907.

H. B. SAWYER.
TROLLEY WHEEL.
APPLICATION FILED FEB. 20, 1905.

Witnesses
Geo. S. Cole
Nellie Evans

Inventor
Harry B. Sawyer
by Wm. M. Monroe
Attorney

UNITED STATES PATENT OFFICE.

HARRY B. SAWYER, OF CLEVELAND, OHIO.

TROLLEY-WHEEL.

No. 862,350.　　　　Specification of Letters Patent.　　　　Patented Aug. 6, 1907.

Application filed February 20, 1905. Serial No. 246,432.

*To all whom it may concern:*

Be it known that I, HARRY B. SAWYER, a citizen of the United States, and a resident of Cleveland, county of Cuyahoga, State of Ohio, have invented certain new and useful Improvements in Trolley-Wheels, of which I hereby declare the following to be a full, clear, and exact description, such as will enable others skilled in the art to which it appertains to make and use the same.

The invention relates to improvements in trolley wheels and the objects are to provide a metal wheel composed of hard material for the flanges or rim such that it will be adapted to withstand the blows and rough usage to which such wheels are liable, and a ring or intermediate portion between the flanges which is formed of softer material such as bronze and adapted to provide a good conductor for the electric current, and serve as the tread portion of the wheel.

A further object of the invention is to make the ring detachable from the rim and body of the wheel so that when worn or broken it can readily be replaced without renewing the entire wheel.

The invention consists in the split ring in the outer edge of which is turned or cast the trolley groove for engagement with the transmission wire, in means for securing the same in place, and in other details of construction and arrangement of parts, as hereinafter described, shown in the accompanying drawings, and specifically pointed out in the claims.

Figure 1:
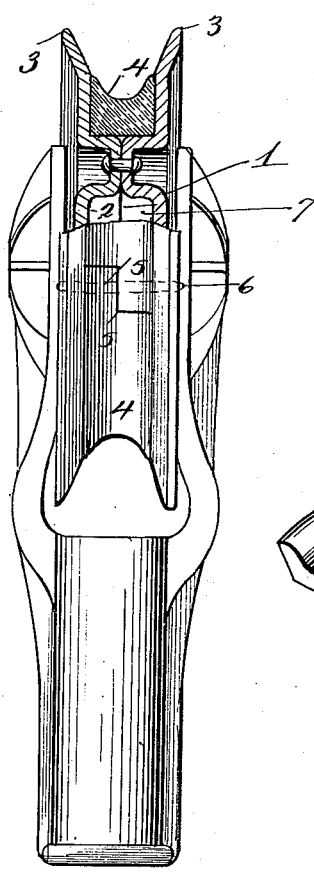
Figure 3:
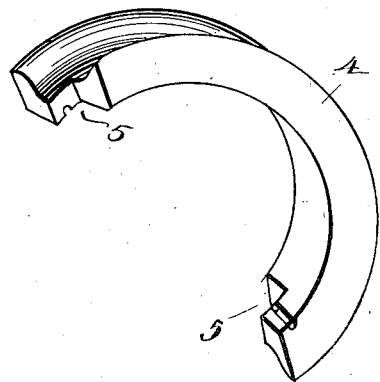
Figure 2:
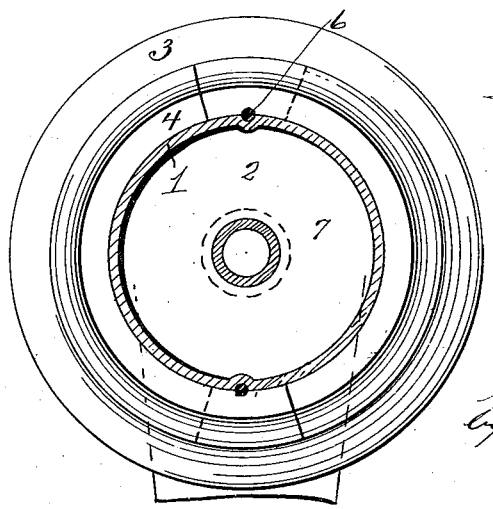

In the accompanying drawings, Figure 1 is an elevation of the trolley which is mounted in its harp and partly broken away to show the relative positions of the engaging parts; Fig. 2 is a transverse section of the wheel which is shown as formed of two side or rim plates inclosing an oil reservoir between them, and also showing the manner of securing the tread ring thereto; Fig. 3 is a perspective view of one half of the ring.

In these views, 1 is the body of the wheel which is seen to consist of two plates, 2, and rim portions 3, riveted securely together and so shaped as to form a channel at the outer edge for the reception of the tread ring 4.

It is not desirable that either of the rim portions should be removed to permit the withdrawal of the tread ring since such a construction would add to the complexity of the device and expense of construction, hence to enable the ring to be easily withdrawn it is split or cut transversely into two halves, which can be brought together from each side over the body and afterwards fastened in place.

The ends of the ring sections are cut away on the sides at 5 so that the abutting ends of the sections will overlap each other and prevent any unevenness or wearing of a groove in the face of the tread by a complete transverse joint. The extremities of the sections are then secured by means of a key or keeper such as a pin 6 passing through them and through the exterior rim.

This device is simple and inexpensive in construction, and may be of great economy in use since the bronze tread ring is of much more expensive material than the body and rim, which can be made of sheet steel or malleable or cast iron or steel.

In the drawings the body and rim portions are shown to be constructed of sheet metal and each side is concaved so that when the parts are united they form together a reservoir 7 to contain the lubricating oil for the journal of the wheel. These parts as shown are riveted securely together.

I do not confine myself, however, to the use of the detachable tread ring for any particular class of wheel, since any wheel body provided with extended rim flanges adapted to receive the tread ring between them will come within the spirit of my invention.

Having described the invention, what I claim as new and desire to secure by Letters Patent, is:

1. A trolley wheel tread portion, comprising a sectional grooved ring, the adjacent extremities of said sections being adapted to overlap each other substantially as described.

2. In a trolley wheel provided with extended rim flanges, a separable tread ring seated between said flanges, the sections of said ring having overlapping extremities.

3. A sectional tread ring for a trolley wheel the several sections of which are provided with overlapping extremities.

4. A sectional tread ring for a trolley wheel, the extremities of the sections comprising the ring overlapping on the center line of the tread surface, substantially as described.

5. In a trolley wheel comprising side portions shaped to form extended flanges, a tread ring in separable sections secured between said flanges, the said flanges extending beyond and protecting said tread ring, the said ring sections having overlapping extremities, and pins passing through said overlapping ends of the ring sections, and through said side portions, substantially as described.

In testimony whereof I hereunto set my hand this 18" day of February 1905.

HARRY B. SAWYER.

Witnesses:
　WM. M. MONROE,
　GEO. S. COLE.